United States Patent [19]
Royle

[11] Patent Number: 5,823,259
[45] Date of Patent: Oct. 20, 1998

[54] WELL CAP SNORKEL VENT

[75] Inventor: Stephen D. Royle, Stoughton, Wis.

[73] Assignee: Baker Manufacturing Company, Evansville, Wis.

[21] Appl. No.: 762,633

[22] Filed: Dec. 9, 1996

[51] Int. Cl.[6] ................................ F16K 24/04
[52] U.S. Cl. ........................ 166/97.1; 137/202
[58] Field of Search .............. 166/97.1, 75.13; 405/36, 37; 137/202, 430

[56] References Cited

U.S. PATENT DOCUMENTS

| | | | |
|---|---|---|---|
| 4,411,312 | 10/1983 | English ................................ | 166/75 R |
| 4,457,448 | 7/1984 | Beagell ................................ | 220/327 |
| 4,865,526 | 9/1989 | Clark et al. ......................... | 417/360 |
| 5,042,519 | 8/1991 | Kerlin ................................. | 137/202 X |
| 5,613,513 | 3/1997 | Makowan ............................ | 137/202 X |
| 5,687,756 | 11/1997 | Van Natte et al. ................... | 137/202 |

OTHER PUBLICATIONS

Copy of Brochure by Hawkins Manufacturing, Harpursville, New York: "Sure–Fit Well Cap".

Primary Examiner—William P. Neuder
Attorney, Agent, or Firm—Quarles & Brady

[57] ABSTRACT

A dual float snorkel vent for use in sealing a well conduit vent cap from flood waters that could contaminate well water therebelow. A lower float causes an upper float to seal a check valve as water rises and prior to water reaching the level of the upper float and the snorkel vent is positioned at an appreciable vertical distance below an inlet to the vent cap to ensure that no water enters the vent conduit.

4 Claims, 2 Drawing Sheets

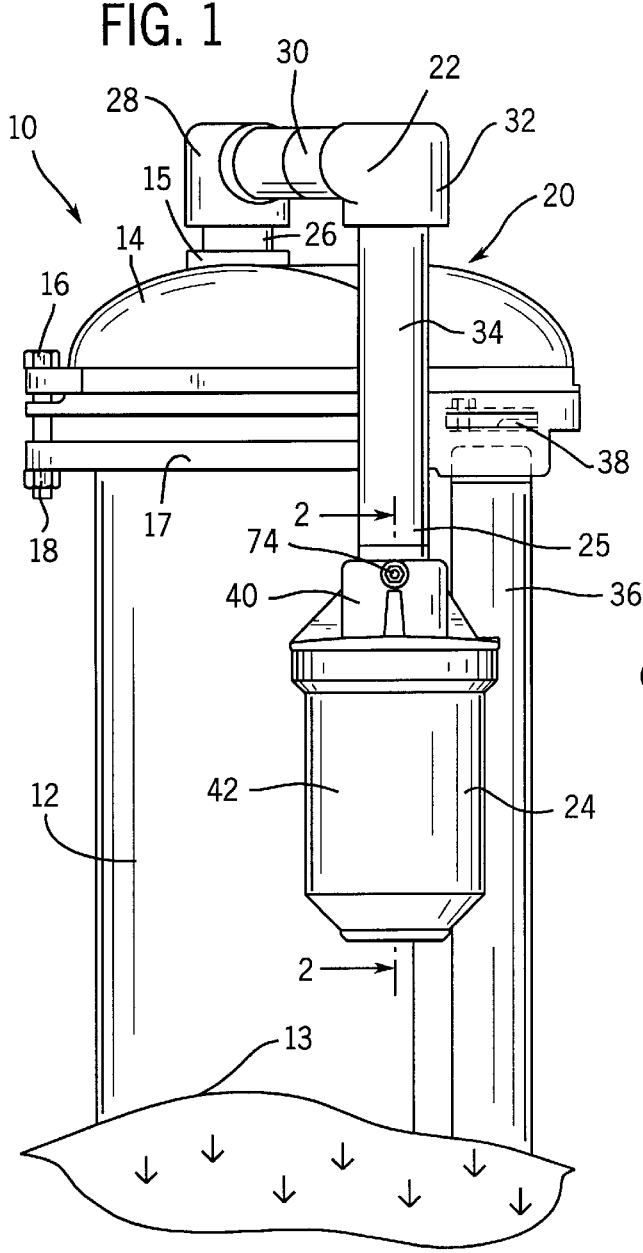
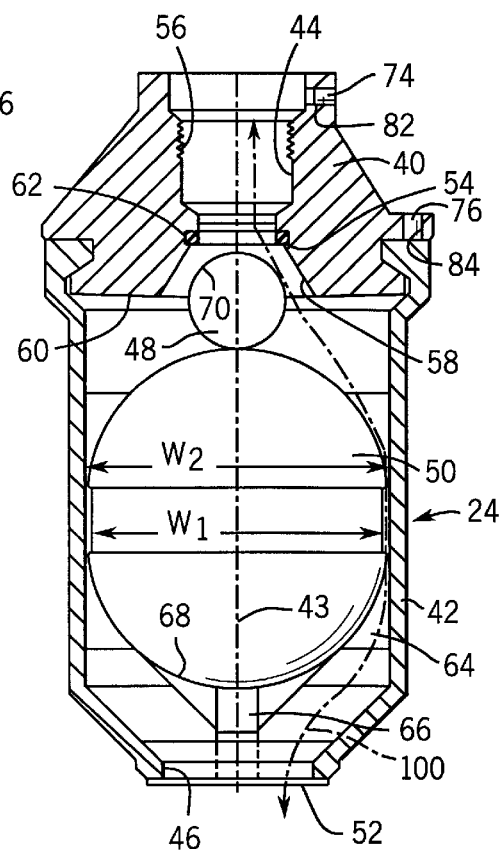
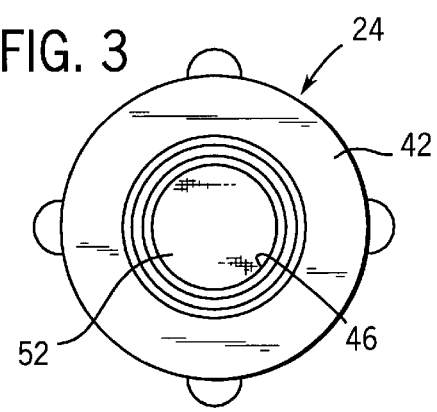

WELL CAP SNORKEL VENT

FIELD OF THE INVENTION

This invention relates to vents for well caps and more particular to a watertight snorkel vent for blocking flood waters from entering a well.

BACKGROUND OF THE INVENTION

Many residential and commercial water supplies in rural areas include an underground storage well and a pump to pump water therefrom to a surface faucet into a home or the like for use. Usually the pump is located below ground within the storage well and control signals and electrical power are provided thereto from an aboveground controllable power source.

Depending upon weather conditions and water demands, well water levels rise and fall. For example, during spring and fall rain seasons well water levels will typically rise and achieve relatively high levels. During a drought or when large quantities of water are required to irrigate crops or other plants, well levels typically recede appreciably.

In order to maintain a relatively constant well pressure despite varying well water levels, typically a well will include a long vertical vent conduit which extends upward from the well to a height of about 1 to 2 feet above ground level. When the well water level rises, air escapes through the vent conduit and when the water level recedes, air enters the well through the conduit so that well pressure is generally equalized at all times.

In addition to equalizing well pressure, the conduit is also used to provide the electricity and control signals to the pump to both power and control the pump. Typically a separate relatively more narrow electrical conduit will be provided either adjacent the well conduit or within the well conduit, attached to an internal well conduit wall. In addition to protecting electrical wires, the electrical conduit also allows access to the pump for maintenance purposes or for replacement.

Because well water is used for virtually all purposes including drinking, cleaning, cooking and bathing, contaminants within a well are always a concern. For this reason, virtually every well vent conduit is covered with a vent cap to prevent debris (i.e. leaves, dirt, unsuspecting vermin, . . . ) from falling therethrough into the well. However, to still allow air venting, every vent is designed to allow air flow between the ambient and the well through the conduit.

One common design includes a laterally extending pipe that extends from the well cap that is down turned at its distal end so that its distal end opens downwardly. In this case, leaves and other debris cannot fall directly into the well through the conduit.

In addition, to prevent vermin from crawling up through the extending pipe and falling into the well, typically a screen is included that covers the distal end of the pipe. While a screened extending pipe works well under most conditions to keep well water clean, when flooding occurs and flood water levels rise above the pipe extension, the extending pipe solution fails miserably and flood waters often contaminate well water by passing up through the extending pipe, into the well conduit and down into the well. After flood waters recede, contaminated wells have to be opened, chlorinated, tested, and pumped out and retested until bacteria levels within the water reach an acceptable low level. The well cleaning process is expensive, time consuming and wastes large quantities of clean water.

The problem described above has generally been recognized in the well industry. U.S. Pat. No. 411,312 which issued to Donald English on Oct. 25, 1983 entitled "Water-Tight Conduit Well Cap", describes one solution wherein a check valve is provided in an upper portion of the laterally extending pipe near the top of the well cap. Apparently, the English solution is to provide a single ball within the check valve that rises therein when flood water height exceeds the ball's lowest resting position and causes the ball to seat on a ball seat thereabove when flood levels get to high. When the flood water recesses, the ball drops with the water and opens the valve, again allowing air to pass between the ambient and the well through the conduit.

While the English solution ideally solves the contamination problems associated with flooding, in reality, the English solution and other solutions like it do not operate 100% effectively all of the time. Unfortunately, even a small amount of bacteria infested water can contaminate an entire well in a short period of time as bacteria multiply rapidly in damp well environments.

One reason the English solution is not 100% effective is its design. With the English ball check valve, flood water has to reach at least the level of the lower most surface of the ball, and usually will reach even a higher level, prior to the ball becoming buoyant. Because the English valve is located at the top of the extending pipe near the top of the well cap, and because the flood water level has to reach a relatively high level prior to raising the ball from its lowest rest position, when the ball actually closes the valve, the water level is relatively high in the lateral pipe extension and can splash up so that a small amount of the water passes through the check valve and into the conduit and down to the well therebelow prior to closing the valve.

This problem is exacerbated as many floods include conditions such as fast flowing water, rapid level changes and even waves that crash up and down rapidly and in a repeated fashion. Where waves occur, a single ball within a valve may become submerged as the water level changes rapidly and may only close the check valve after a larger amount of water passes therethrough.

In addition, even where flood waters are relatively calm, the English check valve which incorporates a small single ball may not provide sufficient pressure on the ball seat to cause a complete and watertight seal. In effect, a small single ball may not be sufficiently buoyant to provide the upward pressure on the ball seat.

Therefore, it would be advantageous to have a vent cap mechanism that prohibits vermin or debris from falling into a well through a vent conduit and ensures that no flood water can pass through the conduit into the well.

SUMMARY OF THE INVENTION

The present invention includes a dual float check valve that is positioned on the distal and downwardly opening end of a lateral extension pipe, the pipe connected to a conduit vent cap. The valve is located at a level appreciably lower than the top portion of the laterally extending pipe so that even if a small amount of water did pass through the valve, the water would not be of a sufficient volume to make its way up through the pipe thereabove and into the well conduit. The valve includes a relatively large float positioned below and axially aligned with a relatively small float thereabove. When flood water reaches the level of the lower most surface of the large float, the large float becomes buoyant and rises with the flood water upwardly causing the smaller float thereabove to seat on, and seal against, a ball seat thereabove.

One object of the present invention is to provide a check valve that eliminates the possibility of flood waters entering a well conduit vent. In the present case, by providing the check valve at a lower most distal end of the extension pipe, even if water does pass through the check valve, the small amount that passes therethrough will not be sufficient to cause water to enter the conduit. In addition, because two floats are used instead of one, the lower float causes the upper float to rise and close the check valve prior to flood water reaching the lowest surface of the upper ball. Moreover, to increase the vertical distance between flood waters and the ball seat when the check valve closes, the lower float is preferably oblong along a vertical axis. This design ensures that even flood waves will not force water up within the valve to the level of the upper float prior to the valve closing.

Another object of the present invention is to provide a relatively large head of pressure on a check valve for use with a well cap so that a secure water tight seal is formed. In the present case, because the lower float is relatively large when compared to the upper float, additional pressure from flood waters therebelow causes a large amount of pressure between the upper float and the ball seat thereabove.

Another object of the invention is to provide a tamper resistant snorkel vent which can still be serviced when required. To this end, preferably, in addition to bolts that hold the snorkel vent together, additional hex torque set screws are provided that can be used to lock the snorkel vent together and can be removed for maintenance purposes.

Yet another object is to ensure that no vermin can crawl up through the extension pipe and into the well conduit. To this end an air inlet to the valve (i.e. to the inventive snorkel vent generally) is covered with a mesh screen or the like.

One other object is to provide a large pressure at the valve seal when the valve is closed but to do so without causing excessive friction between the closing float and a float receiving portion of the valve. To this end, instead of providing a single float that is wide at the bottom and narrower at the top, preferably two separate floats are provided and the upper float is spherical so that it roles along the float receiving valve section and seals without excessive friction.

Additional objects and advantages of the present invention will become apparent and a fuller understanding will be obtained by reading the following detailed description and in reference to the accompanying drawings.

BRIEF DESCRIPTION OF THE DRAWINGS

FIG. 1 is a perspective view of the inventive snorkel vent attached to a vent cap and a conduit vent according to the present invention;

FIG. 2 is a cross-sectional view of the snorkel vent shown in FIG. 1 taken along the line 2—2;

FIG. 3 is a bottom plan view of the snorkel vent in FIGS. 1 and 2;

DETAILED DESCRIPTION OF THE PREFERRED EMBODIMENTS

Physical Embodiment

Figure 4:
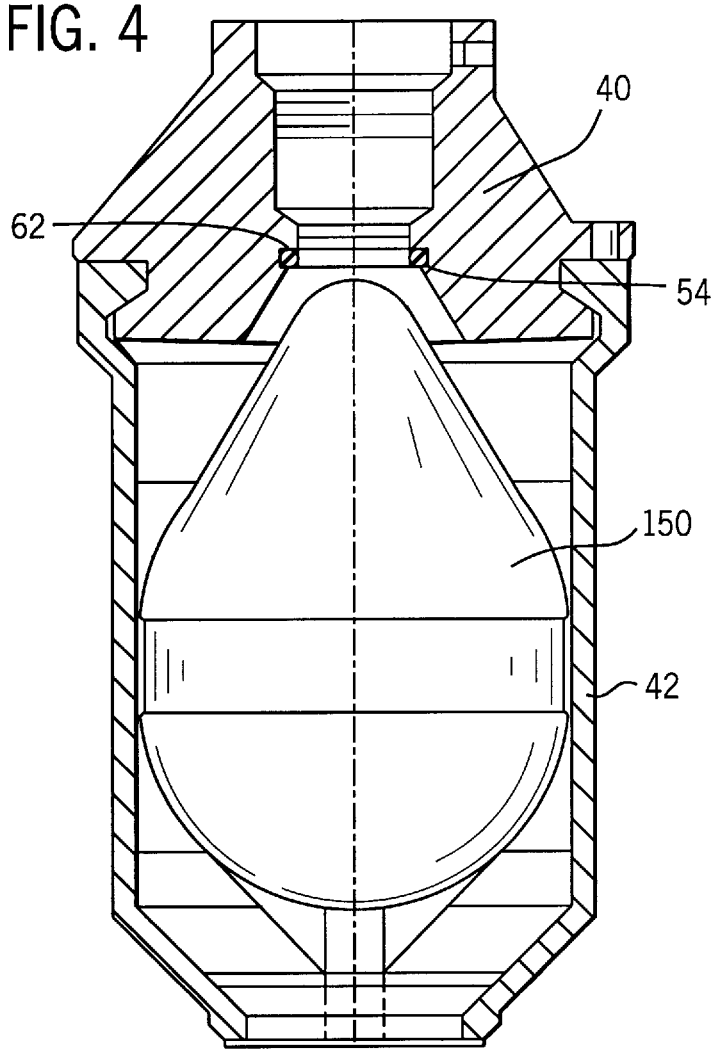
FIG. 4 is similar to FIG. 2 showing a second vent embodiment.

Referring now to the drawings, wherein like reference characters represent corresponding elements throughout the several views, and more specifically, referring to FIG. 1, the present invention will be described in the context of the exemplary vent/cap assembly 10 shown wherein a vent conduit 12 which extends down below ground level 13 to a well therebelow can be observed. The upper or distal end 17 of the vent conduit is capped by a vent cap 14 which is bolted thereto via a plurality of bolts 16 and associated nuts 18 (only a single nut and bolt combination is shown in FIG. 1) so as to form a watertight seal between the cap 14 and the vent conduit 12 as well known in the art. An electrical conduit 36 also extends from a well below the ground level 13 up to the level of the vent cap 14 where it is received in an electrical conduit seal 38 shown in phantom. The electrical conduit seal 38, like the seal between the cap 14 and the vent conduit 12, is watertight. Insulated electrical wires that extend down through the electrical conduit 36 to provide power and control signals to a pump therebelow are not illustrated.

The vent cap 14 forms a single inlet 15, preferably on its top surface. Thus, when the cap 14 is sealed to the vent conduit 12, the only above ground inlet into the conduit is inlet 15.

The inventive snorkel assembly includes a laterally extending extension pipe generally referred to by numeral 22 and a double float check valve 24. The extension pipe 22 includes a plurality of pipe sections that are connected so as to form watertight seals. The pipe leads from a proximal end that is connected to the cap inlet 15 to a distal end 25 that opens downwardly below and laterally spaced from the cap 14.

The extending pipe 22 includes a first vertical section 26 connected at the cap inlet 15 which extends upwardly, a first elbow joint 28 connected at the top or distal end of the first vertical section 26 that opens laterally, preferably perpendicular to the length of the vent conduit 12, a horizontal section 30 connected at one end to the lateral opening of the first elbow joint 28, the horizontal section 30 extending laterally and dimensioned so that, when connected to the first elbow joint 28, its distal end extends laterally past an edge of the vent cap 14 therebelow. A second elbow joint 32 is connected to the distal end of the horizontal section 30 and opens preferably downwardly. A second vertical extension 34 which is preferably substantially longer than the first vertical section 26 is connected to the downward opening of the second elbow joint 32, the lower or distal end 25 of the second vertical extension opening downwardly.

With the above described configuration, the only above ground passageway into the conduit 12 is through the downwardly opening distal end 25 of the extending pipe 22 and through the cap opening 15.

Referring now to FIGS. 1 and 2, the double float check valve 24 includes a housing formed of two sections, an upper housing section 40 and a lower housing section 42, both of which are formed around and are symmetrical with respect to, a central axis 43. The upper housing section 40 forms a keyed outlet 44 including a pipe receiving section 56 at its top end and a restricted float receiving section 58 therebelow. The pipe receiving section 56 is formed so that it securely receives the distal end 25 of the second vertical extension 34 and can form a watertight seal therewith. Any means known in the art can be used to connected the upper housing section 40 to the distal end 25 and because many different way of connecting plumbing elements are well known in the art, none of those ways of connecting are described here in detail.

The float receiving section 58 is preferably approximately centrally located in a bottom wall 60 of the upper housing section 40. The float receiving section 58 is preferably frusto conical in shape having a wider opening adjacent the lower wall 60 and a narrower opening thereabove. Around the narrow upper edge of the float receiving section 58, the upper housing section 40 forms a seal receiving recess 62 for receiving a sealing mechanism such as a suitably sized rubber O-ring 54. The size of the O-ring 54 and the associated upper opening of the float receiving section 58 should be formed so that the upper float 48 can be securely seated thereon forming a complete seal therewith when forced against the O-ring 54.

The lower housing section 42 forms a chamber or passageway 64 having a width dimension $W_2$ and forms an air inlet 46 at its lower or distal end. When the upper and lower housing sections 40 and 42 are secured together, the lower wall 60 of the upper housing section 40 forms an upper wall for the passageway 64 such that the outlet 44 and the air inlet 46 are both aligned along the central axis 43.

Referring still to FIG. 2, preferably the upper float 48 is a spherical ball float and the lower float 50 is an oblong or elliptical float oriented with its length aligned along the central axis 43. Also, preferably, the lower float 50 is substantially larger than the upper float 48. The lower float 50 has a width dimensions $W_1$ that is slightly less than the width dimensions $W_2$ of the passageway 64 so that there is a slight gap ($W_2$–$W_1$) between the lower float 50 and the internal walls of the lower housing section 42. The lower float 50 includes an extending element 66 that extends downwardly from a lower most surface 68 of the float 50 along the central axis 43. While the upper and lower housing sections 40 and 42, respectively, are shown as fitted, they can be securely connected by any manner known in the art. For example, a series of bolts and associated nuts (not shown) might be used to secure the two sections together.

Referring to FIGS. 2 and 3, a screen 52 is provided which covers the air inlet 46 and is integrally connected to the bottom edge of the lower housing section 42. This screen prevents vermin from entering the housing 24 but allows flood waters to enter relatively unobstructed. The extending section 66 of the lower float 50 contacts the central portion of the screen 52 when the float 50 is in its lowest possible position within the housing 24 and prevents the float 50 from forming a seal with the air inlet 46 or other portions of the lower housing section 42.

Also, importantly, the distance between the lowest or distal end of the extending section 66 and an upper surface 70 of the upper float 48 must be greater than the distance between the screen 52 at the bottom of the housing 24 and the O-ring or seal 54 at the top of the housing 24. In this way, when no flood water is present, both the upper and lower floats 40, 50, respectively, rest in their low positions shown in FIG. 2 and the upper float 48 is not sealed against the O-ring 54.

Figure 5:
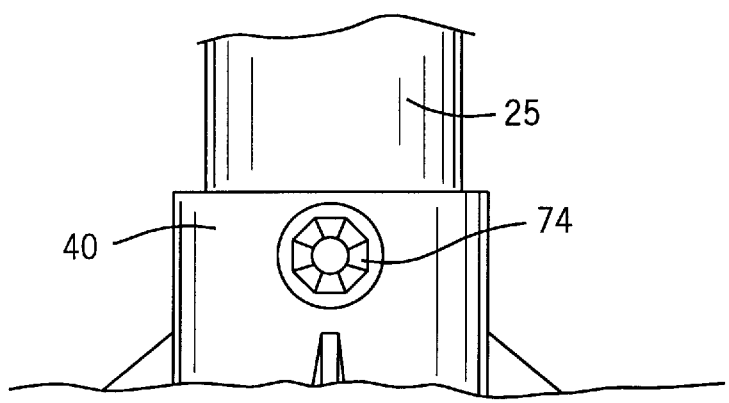
FIG. 5 is a partial perspective view of the installed locking hex nut of FIG. 1.

Referring to FIGS. 1, 2 and 5, another feature of the inventive snorkel assembly 24 includes two or more locking mechanisms which preferably take the form of hex nuts 74, 76 that extend through bores 82, 84, respectively. Hex nut 74 extends through bore 82 and abuts the distal end 25 of the second vertical pipe section 34 to lock the pipe section 34 and the upper housing section 40 together. Because the hex nut 74 has a relatively uncommon shape, the nut cannot be easily be removed without appropriate tools and therefore reduces the possibility of tampering. However, for maintenance purposes, the nut 74 can easily be removed with a suitably sized hex nut wrench. Similarly, hex nut 76 extends through bore 84 and locks the upper and lower housing portions 40 and 42, respectively, together and cannot be easily removed unless proper tools are used.

In Operation

In operation, referring to FIGS. 1 and 2, when there is no flood water present, both the upper 48 and lower float 50, under the force of gravity, assume their lowest possible positions within the passageway 64. In this case, the lower float 50 rests on its extending section 66 which supports the float 50 above the screen 52. The upper float 48 rests on top of the lower float 50 at least partially within the float receiving section 58 thereabove. At this time, because the lower most surface 68 of the lower float 50 is held above the air inlet 46 by the extending section 66 therebelow, air travels along the path identified by arrow 100 in either direction between the air inlet 46 and the pipe receiving section 56 which leads to the vent conduit 12 through the extension pipe 22 and cap inlet 15.

However, when flood waters begin to rise, referring still to FIGS. 1 and 2, flood water eventually rises above the level at which screen 52 is positioned and enters the housing 24 through the outlet 46. As flood water rises within the housing 24, at some point the flood water reaches a level just above the lower surface 68 of the float 50 at which time the lower float 50 becomes buoyant and begins to rise along with the flood water. Because there is only a small gap ($W_2$–$W_1$) between the lateral surface of the lower float 50 and the internal wall of passageway 64 and because the lower float is relatively oblong in the vertical direction, even where water level within the passageway 64 rises rapidly due to flood waves or the like, water forced into the gap ($W_2$–$W_1$) is hindered and its volume is minimized.

As the lower float 50 rises, the upper float 48 thereabove, which is in contact with the lower float 50, also rises. As the upper float rises 48, the upper float 48 is guided by the frusto conical float receiving section 58 into alignment with the rubber O-ring seal 54 thereabove. Because the upper float 48 is spherical, when forced upward, it roles within the frusto conical receiving section 58 and friction between the float 48 and section 58 is minimized. This would not be the case if the upper and lower floats were connected (see FIG. 4). In that situation, friction between the sealing upper portion of the float and section 58 may cause damage to the sealing upper portion of the float or hinder valve closing until some water passes through the valve.

Eventually, when the lower float 50 and upper float 48 rise sufficiently, the upper float 48 contacts the O-ring 54 and forms a watertight seal therewith. As the water continues to rise, the head of water rising inside the passageway 66 continues to add pressure forcing the upper and lower floats 48, 50, respectively, upwardly with greater force and tending to cause a complete seal between the upper float 48 and the O-ring 54. No water is able to pass from within the passageway 64 through the outlet 44 and into the vent conduit 12 to contaminate water in the well therebelow.

As the flood waters recede, the pressure between the upper float 48 the seal 54 is slowly reduced. When the flood waters recede to a level near the bottom surface 68 of the lower float 50, both the upper and lower floats 48, 50, respectively, begin to drop with the water level. Eventually, when the water level recedes enough, the lower float 50 is again supported by its extending section 66 on the screen 52 therebelow. When the water recedes below the level of the screen 52, air is able to pass between the air inlet 46 and the outlet 44 along the path indicated by arrow 100.

Importantly, with the inventive double float snorkel vent, even when flood waters are relatively violent and result in crashing waves, water in the passageway 64 cannot rise above the upper surface 70 of the upper float 48 prior to the upper float 48 and lower float 50 rising to seal the valve. In addition, because the inventive snorkel vent is positioned at the lower most or distal end 25 of the laterally extending pipe 22 and is well below the inlet 15 through the vent cap 14 (e.g. at least two and preferably twelve or more inches below), even if a small amount of water did make it through the outlet 44 prior to the valve being closed, that water would not be of a sufficient volume to make it up through the second vertical section of pipe 34 and into the vent conduit 12.

It should be appreciated that the apparatus as described above are only exemplary and do not limit the scope of this invention, and that various modifications could be made by those skilled in the art that would fall under the scope of the invention. For example, referring to FIG. 4, while the present invention is described as including separate upper and lower floats, clearly a single float 150 having a large bottom and a relatively smaller upper section and including an extending section 66 therebelow could be used. However, as indicated above, while this design would be advantageous over the known prior art, this design might cause appreciable friction between the float receiving section 58 and the upper portion of the float thus hampering operation of the valve and causing additional wear on the float's upper portion.

In addition, instead of including a separate extending section 66, the lower float 50 could be formed so that it does not conform to the lower walls of the lower housing section or the air inlet 46 so that the float 50 itself would contact a portion of the internal wall of the lower housing section 50 and maintain the float 50 above the inlet 46.

To apprise the public of the scope of this invention we make the following claims:

We claim:

1. An apparatus for allowing air to pass through an inlet to a well vent conduit between the conduit and an ambient area outside the conduit when flood levels are below a threshold level and for blocking flow through the inlet when flood levels exceed the threshold level, the conduit including a watertight well cap at an upper distal end, the apparatus comprising:

a snorkel including a housing forming a substantially vertical internal passage from an air inlet at a bottom end to an outlet at a top end, the outlet forming a float seat, the top end of the snorkel linked to the cap inlet to allow fluid communication between the snorkel and the vent conduit, the snorkel also including a lower float positioned adjacent the air inlet and an upper spherical ball float positioned between the lower float and the float seat, the lower float being larger than the upper float and oblong along the length of the passage, the float seat formed so as to receive the upper float to form a watertight seal, the passage being longer than the combined dimensions of the upper and lower floats along the length of the passage from the top end to the bottom ends;

a laterally extending pipe connected at a proximal end to the cap inlet and at a distal end to the top end of the snorkel, the distal end forming an opening that opens downwardly.

2. An apparatus for allowing air to pass through an inlet to a well vent conduit between the conduit and the ambient when flood levels are below a threshold level and for blocking flow through the inlet when flood levels exceed the threshold level, the conduit including a watertight well cap at an upper distal end, the apparatus comprising:

a snorkel including a housing forming a substantially vertical internal passage from an air inlet at a bottom end to an outlet at a top end, the outlet forming a float seat, the top end of the snorkel linked to the cap inlet to allow fluid communication between the snorkel and the vent conduit, the snorkel also including a lower float positioned adjacent the air inlet and an upper float positioned between the lower float and the float seat, the float seat formed so as to receive the upper float to form a watertight seal, the passage longer than the combined dimensions of the upper and lower floats along the length of the passage from the top end to the bottom end;

a laterally extending pipe connected at a proximal end to the cap inlet and at a distal end to the top end of the snorkel, the distal end forming an opening that opens downwardly, where the distal end of the pipe is at least two inches below the cap inlet.

3. The apparatus of claim 2 wherein the distal end of the pipe is at least one foot below the cap inlet.

4. An apparatus for allowing air to pass through an inlet to a well vent conduit between the conduit and the ambient when flood levels are below a threshold level and for blocking flow through the inlet when flood levels exceed the threshold level, the conduit including a watertight well cap at an upper distal end, the apparatus comprising:

a snorkel including a housing forming a substantially vertical internal passage from an air inlet at a bottom end to an outlet at a top end, the outlet forming a float seat, the top end of the snorkel linked to the cap inlet to allow fluid communication between the snorkel and the vent conduit, the snorkel also including a lower float positioned adjacent the air inlet and an upper float positioned between the lower float and the float seat, the float seat formed so as to receive the upper float to form a watertight seal, the passage longer than the combined dimensions of the upper and lower floats along the length of the passage from the top end to the bottom end, the housing including a screen over the air inlet, the lower float including an extending element that contacts the housing to maintain the lower float above the air inlet.

* * * * *